(12) United States Patent
Kato

(10) Patent No.: US 10,003,709 B1
(45) Date of Patent: Jun. 19, 2018

(54) IMAGE PROCESSING APPARATUS AND PROGRAM

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Hiroyuki Kato, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/466,053

(22) Filed: Mar. 22, 2017

(30) Foreign Application Priority Data

Feb. 10, 2017 (JP) .................................. 2017-023357

(51) Int. Cl.
*H04N 1/04* (2006.01)
*H04N 1/00* (2006.01)
*H04N 1/32* (2006.01)

(52) U.S. Cl.
CPC ..... *H04N 1/00938* (2013.01); *H04N 1/00498* (2013.01); *H04N 1/32122* (2013.01); *H04N 2201/0094* (2013.01)

(58) Field of Classification Search
CPC ....... H04N 2201/0094; H04N 1/32101; H04N 1/00344; H04N 1/00411; H04N 2201/3273; G06F 3/14; G06F 17/2863; G06F 17/289; G06F 17/30047; G06F 17/3005; G06F 17/30781; G06F 17/30796; G06F 19/3406
USPC ....... 358/1.15, 1.9, 1.18, 1.2, 1.1, 1.16, 442, 358/448, 470; 382/296, 298, 166, 233, 382/248, 255, 276, 286, 295, 305; 709/201, 217, 230, 238, 239
See application file for complete search history.

(56) References Cited

U.S. PATENT DOCUMENTS

| | | | | |
|---|---|---|---|---|
| 7,437,019 B2* | 10/2008 | Kita | .......................... | G06T 3/60 382/276 |
| 8,432,439 B2* | 4/2013 | Kasai | ................. | A61B 1/00041 348/65 |
| 8,773,704 B2* | 7/2014 | Kashimoto | ............... | G06F 3/14 358/1.15 |
| 9,020,847 B2* | 4/2015 | Ishii | ....................... | G06Q 10/08 705/28 |
| 9,210,285 B2* | 12/2015 | Okayama | ........... | H04N 1/00204 |

(Continued)

FOREIGN PATENT DOCUMENTS

JP 2015-106269 6/2015

*Primary Examiner* — Negussie Worku
(74) *Attorney, Agent, or Firm* — Amin, Turocy & Watson LLP

(57) ABSTRACT

According to one embodiment, an image processing apparatus includes a display character string storage unit, an application control unit, and a search unit. The display character string storage unit stores language information indicating the kind of language which can be displayed by the image processing apparatus, and a character string corresponding to the language information. The application control unit executes an application for realizing an additional function of the image processing apparatus. The search unit acquires a character string of the kind of language which the application does not have from the display character string storage unit on the basis of a character string identifier for specifying a character string stored in the display character string storage unit.

6 Claims, 11 Drawing Sheets

(56) References Cited

U.S. PATENT DOCUMENTS

| | | | |
|---|---|---|---|
| 9,554,005 B2* | 1/2017 | Takahashi | H04N 1/00411 |
| 9,641,710 B2* | 5/2017 | Urasawa | H04N 1/00509 |
| 9,690,778 B2* | 6/2017 | Masuko | G11B 27/031 |
| 9,749,482 B2* | 8/2017 | Kanbayashi | H04N 1/00344 |
| 2004/0210841 A1* | 10/2004 | Takahashi | G06F 9/4448 |
| | | | 715/265 |
| 2007/0070473 A1* | 3/2007 | Lu | G06T 11/60 |
| | | | 358/537 |
| 2008/0049267 A1* | 2/2008 | Okayama | H04N 1/00204 |
| | | | 358/474 |
| 2008/0252919 A1* | 10/2008 | Okayama | H04N 1/00204 |
| | | | 358/1.15 |
| 2014/0035829 A1* | 2/2014 | Hyde | G06F 1/1694 |
| | | | 345/173 |
| 2014/0035928 A1* | 2/2014 | Ohgake | G09G 5/24 |
| | | | 345/467 |

* cited by examiner

FIG. 3

| LANGUAGE CODE | LOCALE NAME |
|---|---|
| da-dk | DANISH (DENMARK) |
| de-de | GERMAN (GERMANY) |
| en-gb | ENGLISH (GREAT BRITAIN) |
| en-us | ENGLISH (UNITED STATES) |
| es-es | SPANISH (SPAIN) |
| fi-fi | FINNISH (FINLAND) |
| fr-fr | FRENCH (FRANCE) |
| it-it | ITALIAN (ITALY) |
| ja-jp | JAPANESE (JAPAN) |
| nl-nl | DUTCH (HOLLAND) |
| no-no | NORWEGIAN |
| pl-pl | POLISH (POLAND) |
| ru-ru | RUSSIAN (RUSSIA) |
| sv-se | SWEDISH (SWEDEN) |
| tr-tr | TURKISH (TURKEY) |
| zh-cn | CHINESE (SIMPLIFIED CHINESE CHARACTER, CHINA) |
| zh-tw | CHINESE (TRADITIONAL CHINESE CHARACTER, TAIWAN) |

FIG. 4

| LANGUAGE CODE / CHARACTER STRING IDENTIFIER | da-dk | de-de | en-gb | en-us | es-es | fi-fi | fr-fr | it-it | ja-jp | ... |
|---|---|---|---|---|---|---|---|---|---|---|
| LOCALE NAME | DANISH | GERMAN | ENGLISH (GREAT BRITAIN) | ENGLISH (UNITED STATES) | SPANISH | FINNISH | FRENCH | ITALIAN | JAPANESE | ... |
| 000001 | ... | ... | ... | ... | ... | ... | ... | ... | ... | ... |
| 000002 | ... | ... | ... | ... | ... | ... | ... | ... | ... | ... |
| 000003 | ... | ... | ... | ... | ... | ... | ... | ... | ... | ... |
| 000004 | ... | ... | ... | ... | ... | ... | ... | ... | ... | ... |
| 000005 | ... | ... | ... | ... | ... | ... | ... | ... | ... | ... |
| 000006 | ... | ... | ... | ... | ... | ... | ... | ... | ... | ... |
| ... | | | | | | | | | | |

FIG. 5

| LANGUAGE CODE | en-us | ja-jp |
|---|---|---|
| CHARACTER STRING IDENTIFIER / LOCALE NAME | ENGLISH (UNITES STATES) | JAPANESE |
| 000001 | Filter Setting | フィルタ設定 |
| 000002 | Name | 名前 |
| 000003 | Date | 日付 |
| 000004 | Size | サイズ |
| 000005 | Return | 戻る |
| 000006 | Scan | スキャン |
| ... | ... | ... |

FIG. 6

Plugin Application for MFP

Account: Toshiba Tec

▲folder123

| Category | Name | ∧ ∨ Date | Size |
|---|---|---|---|
| Folder | Longfoldername1_longfoldername2_... | 2017/02/22 06:09 | - - |
| Folder | Folder456 | 2017/02/22 06:09 | - - |
| File | Doc12345.docx | 2017/02/22 06:20 | 18KB |
| File | Doctest1.pdf | 2017/02/22 06:19 | 12KB |
| File | Doctest2.pdf | 2017/02/22 06:11 | 1MB |
| File | Doctest3.pdf | 2017/02/22 06:11 | 93KB |

Filter Setting

Scan   Print

Return

| LANGUAGE CODE | en-us | ja-jp |
|---|---|---|
| CHARACTER STRING IDENTIFIER | ENGLISH (UNITES STATES) | JAPANESE |
| 000001 | Return | 戻る — 401 |
| ... | ... | ... |

410

| LANGUAGE CODE | en-us | es-es — 412 | ja-jp — 413 |
|---|---|---|---|
| CHARACTER STRING IDENTIFIER | ENGLISH (UNITES STATES) | SPANISH | JAPANESE |
| 000001 | Folder | carpeta | フォルダ |
| 000002 | Back | retorno | 戻る — 411 |
| 000003 | ... | ... | ... |
| ... | ... | ... | ... |

FIG. 10

| Category | Name | | Date ∨ | Size |
|---|---|---|---|---|
| Folder | Longfoldername1_longfoldername2_... | | 2017/02/22 06:09 | -- |
| Folder | Folder456 | | 2017/02/22 06:09 | -- |
| File | Doc12345.docx | | 2017/02/22 06:20 | 18KB |
| File | Doctest1.pdf | | 2017/02/22 06:19 | 12KB |
| | est2.pdf MODORU | | 2017/02/22 06:11 | 1MB |
| | est3.pdf MAENI | | 2017/02/22 06:11 | 93KB |
| | USHIRO | | | |
| | SAGARU | | | |

Plugin Application for MFP  ▲folder123   Account : Toshiba Tec   Filter Setting

Return    Scan    Print

IMAGE PROCESSING APPARATUS AND PROGRAM

CROSS-REFERENCE TO RELATED APPLICATION

This application is based upon and claims the benefit of priority from Japanese Patent Application No. 2017-023357, filed Feb. 10, 2017, the entire contents of which are incorporated herein by reference.

FIELD

Embodiments described herein relate generally to an image processing apparatus and a program.

BACKGROUND

In the related art, there is a case where a plugin application which is an application for adding functions to an image processing apparatus in the future can support only some languages supported by the image processing apparatus. For example, the plugin application is shipped as a package product which supports a limited language such as English. After the shipment, a support center at each area performs necessary translation. After the translation, a package for adding a language is created and distributed. A user installs the distributed language package so as to cope with each language. However, creating, distributing, and installing a language package in the future may cause a large number of steps.

DESCRIPTION OF THE DRAWINGS

FIG. 3 is a diagram illustrating a list of language codes and locale names which can be set by a language setting unit.

FIG. 4 is a diagram illustrating a specific example of a display character string table.

FIG. 5 is a diagram illustrating specific examples of character string identifiers and language codes stored in a plugin application.

FIG. 6 is a diagram illustrating a specific example of a display example.

FIG. 9 is a diagram illustrating a specific example of a process in a search unit.

FIG. 10 is a diagram illustrating a specific example of a display example of a plugin application.

DETAILED DESCRIPTION

An object of exemplary embodiments is to provide an image processing apparatus and a program capable of more efficiently displaying a character string of a language which a plugin application does not have.

In general, according to one embodiment, there is provided an image processing apparatus including a display character string storage unit, an application control unit, and a search unit. The display character string storage unit stores language information indicating the kind of language which can be displayed by the image processing apparatus, and a character string corresponding to the language information. The application control unit executes an application for realizing an additional function of the image processing apparatus. The search unit acquires a character string of the kind of language which the application does not have from the display character string storage unit on the basis of a character string identifier for specifying a character string stored in the display character string storage unit.

Hereinafter, an image processing apparatus and a program according to embodiments will be described with reference to the drawings.

First Embodiment

Figure 1:
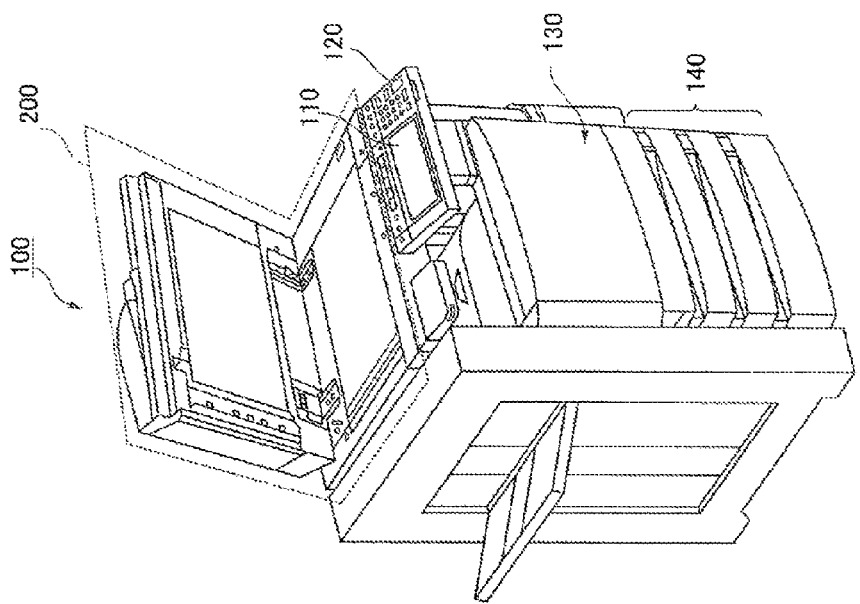
FIG. 1 is an exterior diagram illustrating the entire configuration example of an image processing apparatus according to a first embodiment.

FIG. 1 is an exterior diagram illustrating the entire configuration example of an image processing apparatus 100 according to a first embodiment. The image processing apparatus 100 is, for example, an image forming apparatus such as a multifunction peripheral. The image processing apparatus 100 includes a display 110, a control panel 120, a printer unit 130, a sheet accommodation unit 140, and an image reading unit 200. The printer unit 130 of the image processing apparatus 100 may be a device fixing a toner image, and may be an ink jet type device.

The image processing apparatus 100 processes an image on a sheet by using a developer such as toner. The sheet is, for example, paper or a label paper sheet. The sheet may be any object as long as the image processing apparatus 100 can process an image on a surface of the sheet.

The display 110 is an image display device such as a liquid crystal display or an organic electroluminescence (EL) display. The display 110 displays various pieces of information regarding the image processing apparatus 100. The display 110 is one kind of display unit.

The control panel 120 has a plurality of buttons. The control panel 120 receives a user's operation. The control panel 120 outputs a signal corresponding to an operation performed by the user to a control unit of the image processing apparatus 100. The display 110 and the control panel 120 may be formed as an integral touch panel. The control panel 120 is one kind of input unit.

The printer unit 130 forms an image on a sheet on the basis of image information generated by the image reading unit 200 or image information received via a communication path. The printer unit 130 forms an image, for example, through the following process. An image forming portion of the printer unit 130 forms an electrostatic latent image on a photoconductive drum on the basis of image information. The image forming portion of the printer unit 130 forms a visible image by attaching a developer to the electrostatic latent image. Toner is a specific example of the developer. A transfer portion of the printer unit 130 transfers the visible image onto a sheet. A fixing portion of the printer unit 130 fixes the visible image to the sheet by heating and pressing the sheet. The sheet on which an image is formed may be a sheet accommodated in the sheet accommodation unit 140, and may be a sheet pointed by a hand.

The sheet accommodation unit 140 accommodates sheets used for forming an image in the printer unit 130.

The image reading unit 200 reads image information of a reading target as the brightness of light. The image reading unit 200 records the read image information. The recorded image information may be transmitted to other information processing apparatuses via a network. The recorded image information may be formed as an image on a sheet by the printer unit 130.

Figure 2:
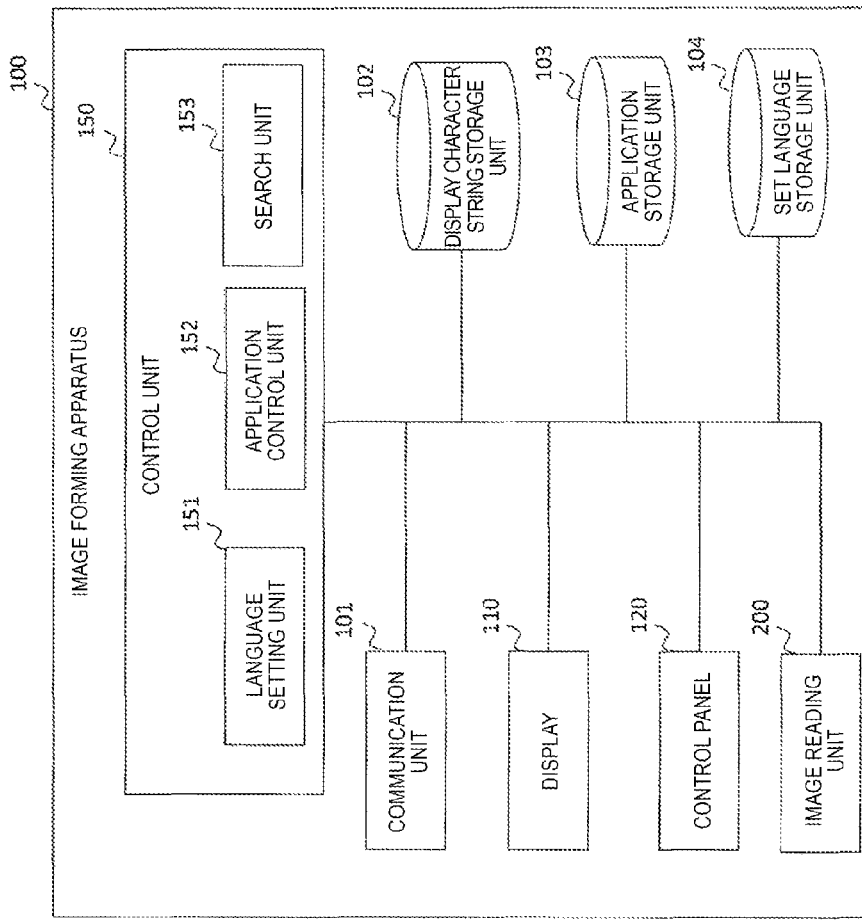
FIG. 2 is a functional block diagram illustrating a configuration of a language complementing function.

FIG. 2 is a functional block diagram illustrating a configuration of a language complementing function of the image processing apparatus 100 according to the first embodiment. The image processing apparatus 100 includes a communication unit 101, a display character string storage unit 102, an application storage unit 103, a set language storage unit 104, the display 110, the control panel 120, a control unit 150, and the image reading unit 200. Configurations of the display 110, the control panel 120, and the image reading unit 200 are the same as described above, and thus description thereof will be omitted.

The communication unit 101 is a network interface. The communication unit 101 is communicably connected to an information processing apparatus (not illustrated) which is different from the image processing apparatus 100 via a network. The information processing apparatus is a personal computer or a server. The communication unit 101 may perform command according to a communication method such as a local area network (LAN) or Bluetooth (registered trademark).

The display character string storage unit 102 is formed of a storage device such as a magnetic hard disk device or a semiconductor storage device. The display character string storage unit 102 stores a display character string table. The display character string table stores a character string used in a standard function of the image processing apparatus 100 and a language corresponding to the character string. The character string is specified by a character string identifier. The character string used in the standard function of the image processing apparatus 100 is, for example, Print, Scan, or Copy which is used for a user to give an instruction to the image processing apparatus 100. The language is, for example, English, Japanese, or German which is used in the standard function of the image processing apparatus 100.

The application storage unit 103 is formed of a storage device such as a magnetic hard disk device or a semiconductor storage device. The application storage unit 103 stores various plugin applications. Each of the plugin applications adds a function to the image processing apparatus 100 in the future. The plugin application stores a character string used in the plugin applications and a language corresponding to the character string. The plugin application stores languages of the number smaller than the number of languages used in the standard function of the image processing apparatus 100. The plugin application is one kind of application.

The set language storage unit 104 is formed of a storage device such as a magnetic hard disk device or a semiconductor storage device. The set language storage unit 104 stores set language information. The set language information is generated by a language setting unit 151.

The control unit 150 controls an operation of each unit of the image processing apparatus 100. The control unit 150 is realized by, for example, a device including a central processing unit (CPU) and a random access memory (RAM). The control unit 150 functions as the language setting unit 151, an application control unit 152, and a search unit 153 by executing a language complementing program.

The language setting unit 151 generates the set language information in response to the user's operation. The language setting unit 151 stores the generated set language information in the set language storage unit 104. A language code specifying the kind of language is defined in the set language information. For example, if a language code indicates English, a character string is displayed in English on the display 110. The language code is a type of language information.

The application control unit 152 executes a plugin application which is stored in the application storage unit 103 via the user's operation. The application control unit 152 acquires the set language information from the set language storage unit 104 when the plugin application is executed. The application control unit 152 acquires a character string identifier of a character string displayed on the display 110 from the plugin application. If the plugin application has a language code included in the acquired set language information, the application control unit 152 acquires a character string stored in the plugin application on the basis of the character string identifier. The application control unit 152 displays the acquired character string on the display 110. If the plugin application does not have a language code included in the acquired set language information, the application control unit 152 outputs the language code and the character string identifier to the search unit 153. The application control unit 152 displays a character string on the display 110 on the basis of results from the search unit 153. For example, if the search unit 153 cannot acquire a character string, the application control unit 152 displays an initially set language (for example, English) which is set in advance in the plugin application, on the display 110. If the search unit 153 can acquire a character string, the application control unit 152 displays the character string received from the search unit 153 on the display 110.

The search unit 153 searches for and acquires a character string from the display character string storage unit 102 on the basis of the language code and the character string identifier. The search unit 153 outputs the acquired character string to the application control unit 152. The search unit 153 acquires the character string by referring to, for example, API for acquiring a character string.

Specifically, an example of the API is "wording=getMessage(messageID, locale)". Here, messageID is the character string identifier. In addition, locale is the language code. If a character string cannot be acquired, the search unit 153 outputs information indicating that a character string cannot be acquired to the application control unit 152.

FIG. 3 is a diagram illustrating a list of language codes and locale names which can be set by the language setting unit 151 of the first embodiment. The language code is a code used for each unit of the image processing apparatus 100 to identify a language. The locale name indicates the name of a language corresponding to a language code. The user selects a language via the control panel 120 on the basis of the locale names displayed on the display 110. The language setting unit 151 generates set language information on the basis of a received locale name. Language codes are not limited to the languages shown in the list. For example, languages (for example, Korean) not shown in the list may be included.

In the example illustrated in FIG. 3, regarding the uppermost language code and locale name, a value of the language code is "da-dk", and a value of the locale name is "Danish (Denmark)". Therefore, if the user selects "Danish (Denmark)" as a locale name, the language setting unit 151 generates set language information including "da-dk" as a language code. The language setting unit 151 stores the set language information in the set language storage unit 104.

The application control unit 152 displays a character string in Danish on the display 110 on the basis of the stored set language information.

FIG. 4 is a diagram illustrating a specific example of a display character string table of the first embodiment. The display character string table has a display character string record. The display character string record has respective values of a language code of each language and a character string identifier. The search unit 153 acquires a character string from the display character string table on the basis of a character string identifier and a language code. For example, if the search unit 153 receives "de-de" as a language code and "000003" as a character string identifier, the search unit 153 specifies a character string corresponding to the language code of "de-de" and the character string identifier of "000003" from the display character string table. The search unit 153 outputs the specified character string to the application control unit 152.

FIG. 5 is a diagram illustrating specific examples of a character string identifiers and language codes stored in a plugin application of the first embodiment. The plugin application stores two national languages such as "en-us" and "ja-jp" as language codes. Therefore, if a language code stored in set language information is "en-us" or "ja-jp", the application control unit 152 acquires the character string from the plugin application and displays the character string on the display 110. For example, if the application control unit 152 receives "en-us" as a language code and "000003" as a character string identifier, the application control unit 152 specifies a character string corresponding to the language code of "en-us" and the character string identifier of "000003" from the plugin application. The application control unit 152 acquires "Date" which is the specified character string. The application control unit 152 displays the acquired character string on the display 110.

In contrast, if a language code stored in set language information is not "en-us" or "ja-jp", the application control unit 152 acquires a character string from the display character string storage unit 102 via the search unit 153 on the basis of the character string identifier and the language code.

FIG. 6 is a diagram illustrating a specific example of display of a plugin application of the first embodiment. A region 300 indicates an image of a plugin application displayed on the display 110. A region 301 to a region 309 indicate character strings displayed on the image of the plugin application. In the region 301 to the region 309, displayed character strings change depending on language codes stored in set language information.

In FIG. 6, a language code stored in set language information is "en-us". Therefore, the character strings in the region 301 to the region 309 are displayed in English (United States). In contrast, if a language code is "ja-jp", the character strings in the region 301 to the region 309 are displayed in Japanese. The character strings displayed in the region 301 to the region 309 respectively correspond to character string identifiers. For example, if a character string identifier corresponding to the region 301 is "000001", the application control unit 152 displays a character string corresponding to the character string identifier of "000001" in the region 301. A list of files or folders which can be operated with the plugin application is displayed in a region 310. Character strings in the region 310 are designated by a user, and thus constant character strings are displayed regardless of language codes. The display of the plugin application illustrated in FIG. 6 is only a specific example.

Thus, display of a plugin application may be configured in an aspect which is different from the aspect illustrated in FIG. 6.

Figure 7:
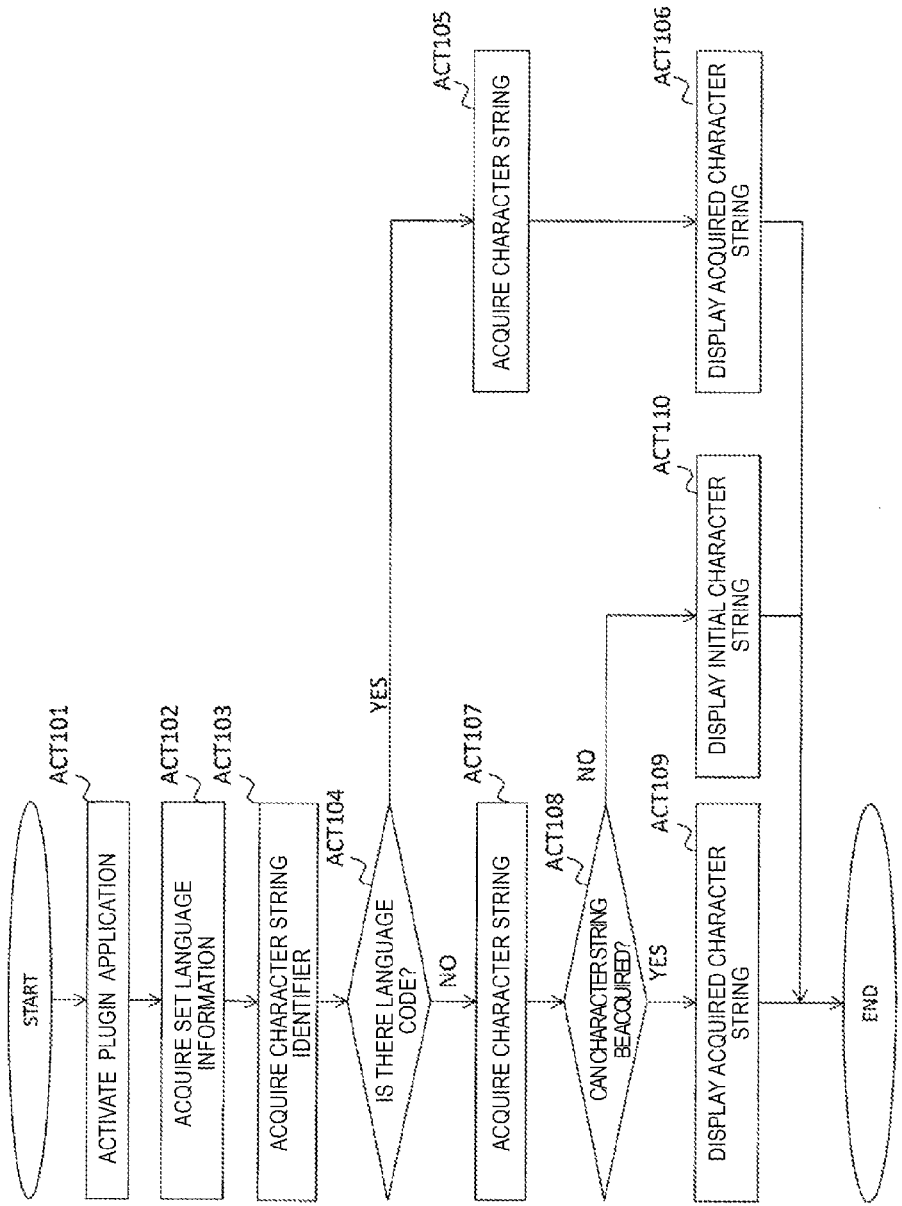
FIG. 7 is a flowchart illustrating a flow of a language complementing process.

FIG. 7 is a flowchart illustrating a flow of a language complementing process in the plugin application of the first embodiment. The application control unit 152 of the image processing apparatus 100 activates a plugin application stored in the application storage unit 103 (ACT 101). The application control unit 152 acquires set language information from the set language storage unit 104 (ACT 102). The application control unit 152 acquires a character string identifier from the plugin application (ACT 103). The application control unit 152 determines whether or not a language code included in the set language information is a language code included in the plugin application (ACT 104).

If the language code is included in the plugin application (ACT 104: YES), the application control unit 152 acquires a character string from the plugin application on the basis of the language code and the character string identifier (ACT 105). The application control unit 152 displays the acquired character string in a predetermined region of the display 110 (ACT 106).

If the language code is not included in the plugin application (ACT 104: NO), the application control unit 152 outputs the language code and the character string identifier to the search unit 153. The search unit 153 acquires a character string from the display character string storage unit 102 on the basis of the language code and the character string identifier (ACT 107). The search unit 153 determines whether or not a character string can be acquired (ACT 108). If the search unit 153 can acquire a character string (ACT 108: YES), the search unit 153 outputs the acquired character string to the application control unit 152. The application control unit 152 displays the received character string in a predetermined region of the display 110 (ACT 108). If the search unit 153 cannot acquire a character string (ACT 108: NO), the search unit 153 outputs information indicating that a character string cannot be acquired, to the application control unit 152. The application control unit 152 displays a character string in a predetermined region of the display 110 on the basis of a language code set as an initial character string in the plugin application (ACT 110).

In the image processing apparatus 100 configured in the above-described way, the search unit 153 acquires a character string from the display character string storage unit 102 on the basis of a language code and a character string identifier. The application control unit 152 displays the acquired character string on the display 110. Thus, a language not included in a plugin application can be displayed on the display 110 without creating or installing a new package. Therefore, a user can omit the number of steps of creating, distributing, and reinstalling a new package in order to add a language to a plugin application after creating and installing the plugin application.

Second Embodiment

Figure 8:
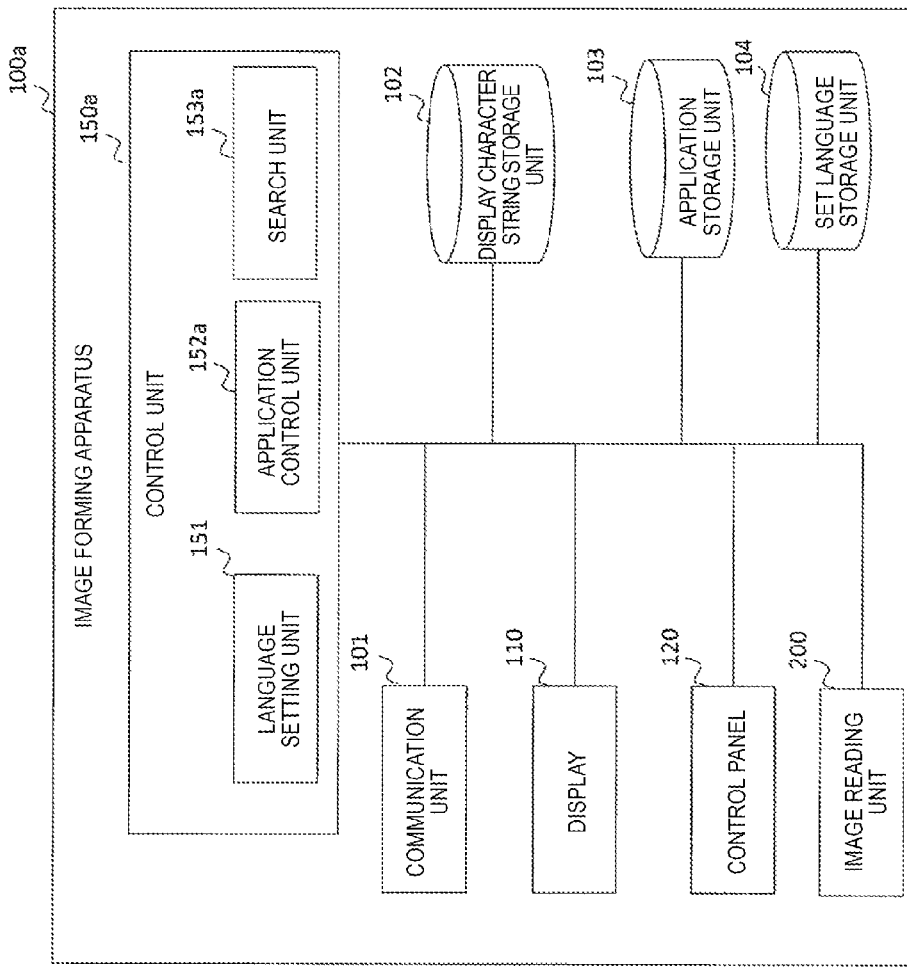
FIG. 8 is a functional block diagram illustrating a configuration of a language complementing function of an image processing apparatus according to a second embodiment.

Next, a description will be made of an image processing apparatus 100a according to a second embodiment. FIG. 8 is a functional block diagram illustrating a configuration of a language complementing function of the image processing apparatus 100a according to the second embodiment. The image processing apparatus 100a of the second embodiment is the same as the image processing apparatus of the first embodiment except that a control unit 150a is provided instead of the control unit 150. Hereinafter, differences from the first embodiment will be described.

The control unit 150a controls an operation of each unit of the image processing apparatus 100a. The control unit 150a is realized by, for example, a device including a CPU and a RAM. The control unit 150a functions as the language setting unit 151, an application control unit 152a, and a search unit 153a by executing a language complementing program. The language setting unit 151 is the same as that in the first embodiment, and thus a description thereof will be omitted.

The application control unit 152a executes a plugin application which is stored in the application storage unit 103 via the user's operation. The application control unit 152a acquires the set language information from the set language storage unit 104 when the plugin application is executed. The application control unit 152a acquires a character string identifier of a character string displayed on the display 110 from the plugin application. The application control unit 152a acquires a character string corresponding to the acquired character string identifier from the plugin application. The application control unit 152a outputs a language code included in the set language information and the character string to the search unit 153a. The application control unit 152a may output a character string of each language included in the plugin application to the search unit 153a. The application control unit 152a displays a character string received from the search unit 153a on the display 110 on the basis of results in the search unit 153a.

The search unit 153a searches the display character string storage unit 102 for a character string on the basis of the language code and the character string. As a result of the search, the search unit 153a acquires a character string having a meaning close to the character string from the display character string storage unit 102. The search unit 153a outputs the acquired character string to the application control unit 152a. The search unit 153a acquires the character string by referring to, for example, API for acquiring a character string. Specifically, an example of the API is "wording=getMessage(messageString, locale)". Here, messageString is a character string of a language stored in the plugin application. In addition, locale is the language code. When a character string is searched for, the search unit 153a may determine a character string having a close meaning by using an external system. The external system may be, for example, a translation site. If there are a plurality of search results, the search unit 153a receives a selection result once from the user. The search unit 153a outputs the selected character string to the application control unit 152a.

FIGS. 9A and 9B are diagrams illustrating a specific example of a process in the search unit 153a of the second embodiment. A region 400 indicates examples of language codes and character string identifiers stored in the plugin application. A region 401 indicates character strings received by the search unit 153a from the application control unit 152a. A region 410 indicates an example of a display character string table. A region 411 indicates a character string having a meaning close to a search target character string, searched for by the search unit 153a. A region 412 indicates a language code received by the search unit 153a from the application control unit 152a. A region 413 indicates a character string acquired by the search unit 153a.

If "return" and "modoru (return in English)" written in the region 401 are received, the search unit 153a searches the display character string table for a character string having a meaning close to "return" and "modoru". As a result of the search, the search unit 153a specifies "modoru" written in the region 411 as a character string having a meaning close to "return" and "modoru". The search unit 153a acquires "retorno" corresponding to the received language code "es-es" among character strings having the same character string identifier as the character string identifier of "modoru". With this configuration, even if character string identifiers are different from each other in a plugin application and a display character string table, a character string can be acquired.

FIG. 10 is a diagram illustrating a specific example of display of a plugin application of the second embodiment. A region 500 indicates an image of a plugin application displayed on the display 110. A region 501 indicates a character string displayed on the image of the plugin application. In the region 501, a displayed character string changes depending on a language code stored in set language information. A character string searched for by the search unit 153a is displayed. A region 502 indicates a specific example of display when a plurality of results are acquired by the search unit 153a as a result of search. If the region 502 is displayed, a user selects any one (for example, "modoru") of character strings displayed in the region 502 via the control panel 120. The selected character string is displayed in the region 501. The display of the plugin application illustrated in FIG. 10 is only a specific example. Thus, display of a plugin application may be configured in an aspect which is different from the aspect illustrated in FIG. 10.

Figure 11:
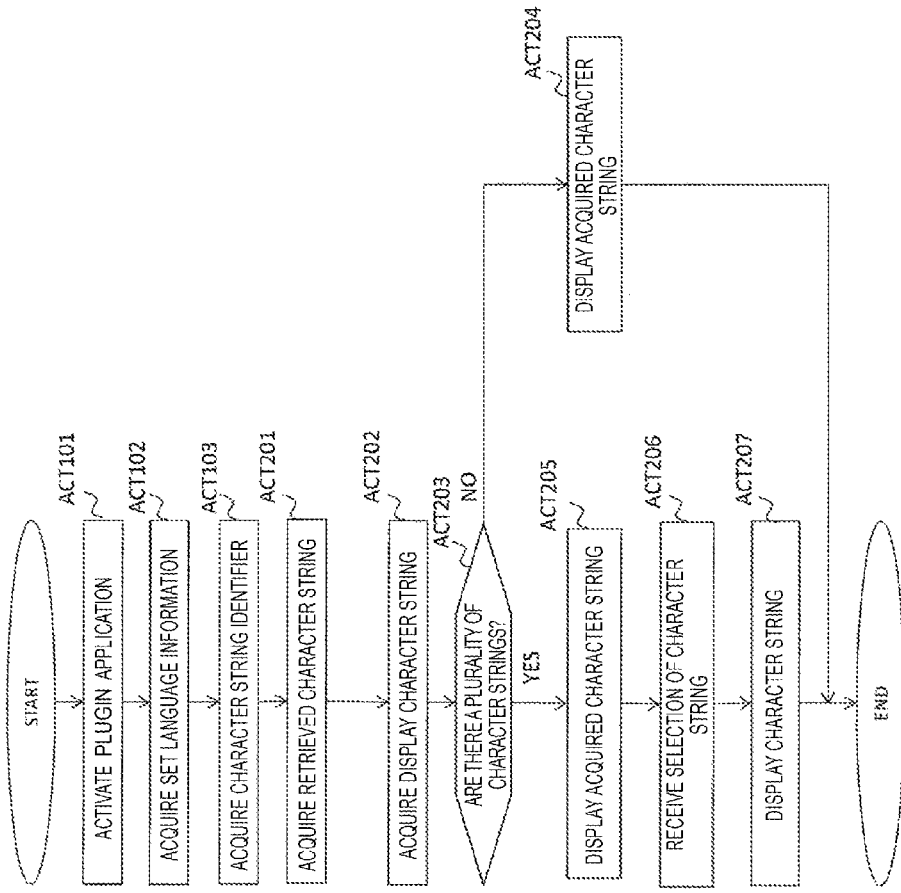
FIG. 11 is a flowchart illustrating a flow of a language complementing process.

FIG. 11 is a flowchart illustrating a flow of a language complementing process in the plugin application of the second embodiment. The application control unit 152a of the image processing apparatus 100 activates a plugin application stored in the application storage unit 103 (ACT 101). The application control unit 152a acquires set language information from the set language storage unit 104 (ACT 102). The application control unit 152a acquires a character string identifier from the plugin application (ACT 103).

The application control unit 152a acquires a search target character string corresponding to the acquired character string identifier (ACT 201). The search unit 153a acquires a character string displayed on the display 110 from the display character string storage unit 102 on the basis of the language code and the character string (ACT 202). The search unit 153a determines whether or not a plurality of character strings can be acquired (ACT 203). If the search unit 153a cannot acquire a plurality of character strings (ACT 203: NO), the search unit 153a outputs the acquired character string to the application control unit 152a. The application control unit 152a displays the received character string in a predetermined region of the display 110 (ACT 204).

If the search unit 153a can acquire a plurality of character strings (ACT 203: YES), the search unit 153a displays all of the acquired character strings in a predetermined region of the display 110 (ACT 205). The search unit 153a receives a character string selected by the user from among the displayed character strings (ACT 206). The search unit 153a outputs the received character string to the application control unit 152a. The application control unit 152a displays the character string in a predetermined region of the display 110 (ACT 207).

In the image processing apparatus 100a configured in the above-described way, the search unit 153a acquires a character string having a close meaning from the display character string storage unit 102 on the basis of a language code and a character string. If only a single character string is acquired, the search unit 153a outputs the acquired character string to the application control unit 152a. If a plurality of character strings are acquired, the search unit 153a receives a character string selected by a user. The search unit 153*a* outputs the received character string to the application control unit 152*a*. Thus, even if the display character string storage unit 102 does not have a character string identifier acquired from a plugin application, the application control unit 152*a* can display a character string on the display. Therefore, a user can omit the number of steps of creating, distributing, and reinstalling a new package in order to add a language to a plugin application after creating and installing the plugin application.

According to at least one of the above-described embodiments, the search unit is provided, and thus it is possible to omit the number of steps of creating, distributing, and reinstalling a new package in order to add a display language to a plugin application.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
    a display character string storage device configured to store language information indicating a kind of language which can be displayed by the image processing apparatus, and a character string corresponding to the language information, wherein the kind of language is used by the image processing apparatus;
    a memory that stores instructions; and
    a processor, coupled to the memory, that facilitates execution of the instructions to perform operations, comprising:
    executing an application for realizing an additional function of the image processing apparatus, wherein the application stores the language information used during execution of the application and the character string;
    setting the kind of language used by the image processing apparatus;
    in response to determining that the language information stored to the display character string storage device corresponds to the kind of language used during execution of the application, acquiring a character string from the application; and
    acquiring a character string of the kind of language which the application does not have from the display character string storage device based on a character string identifier for specifying a character string stored in the display character string storage device.

2. The apparatus according to claim 1, wherein the operations further comprise acquiring a character string from the display character string storage device based on the character string identifier and language information indicating a language used by the application.

3. The apparatus according to claim 1, wherein the operations further comprise acquiring a character string from the display character string storage device based on a character string received from the executing and language information indicating a language used by the application.

4. The apparatus according to claim 3, wherein the operations further comprise:
    receiving selection of the character string from a user in response to a plurality of acquired character strings.

5. The apparatus according to claim 1, wherein the operations further comprise: in response to not acquiring a character string from the display character string storage device, displaying the character string on a display device by using a predetermined language which the application has.

6. A program causing a computer to function as the image processing apparatus according to claim 1.

* * * * *